Sept. 18, 1956  B. R. GARRETT  2,763,108
COUNTING AND PACKAGING MACHINES
Filed April 9, 1952  7 Sheets-Sheet 1
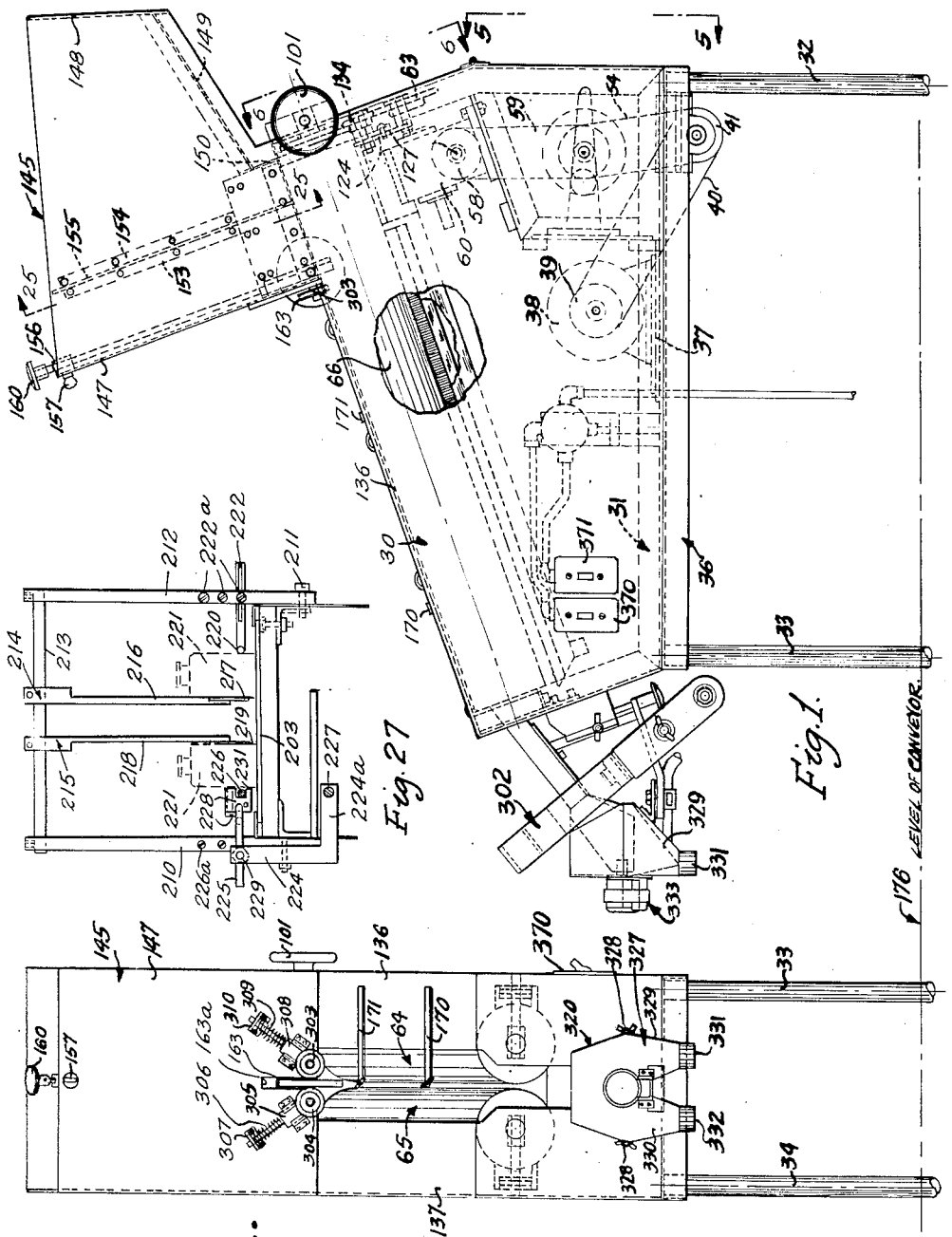
INVENTOR.
BURTON R. GARRETT.
BY
ATTORNEY.

Sept. 18, 1956     B. R. GARRETT     2,763,108
COUNTING AND PACKAGING MACHINES
Filed April 9, 1952     7 Sheets-Sheet 2
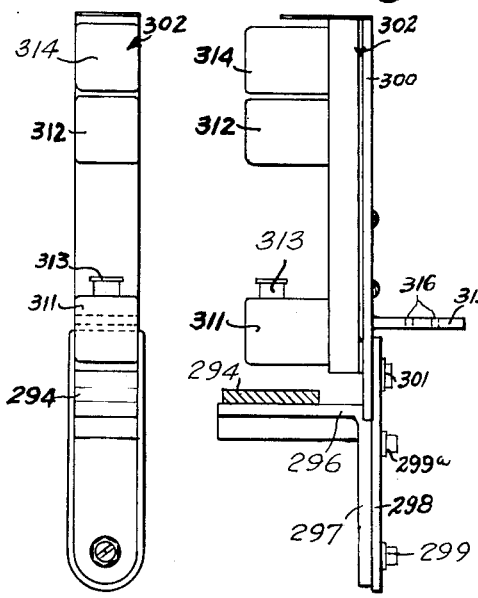
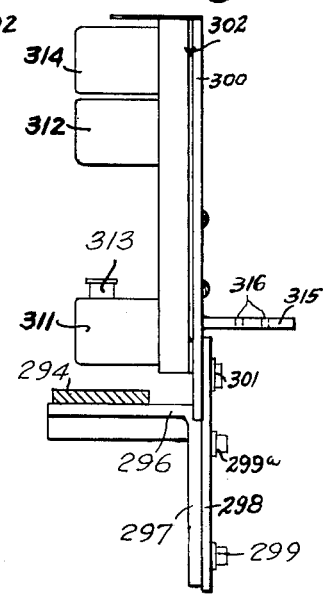
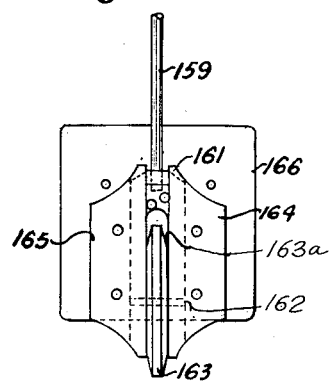
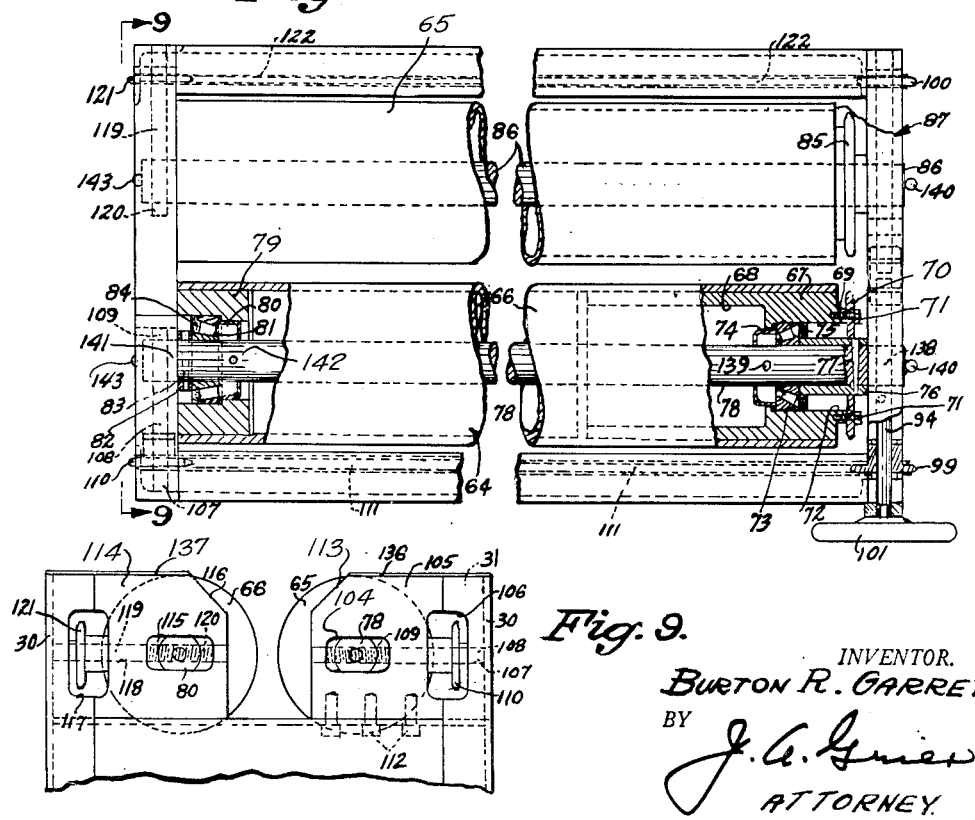
INVENTOR.
BURTON R. GARRETT
BY
J. A. Grier
ATTORNEY

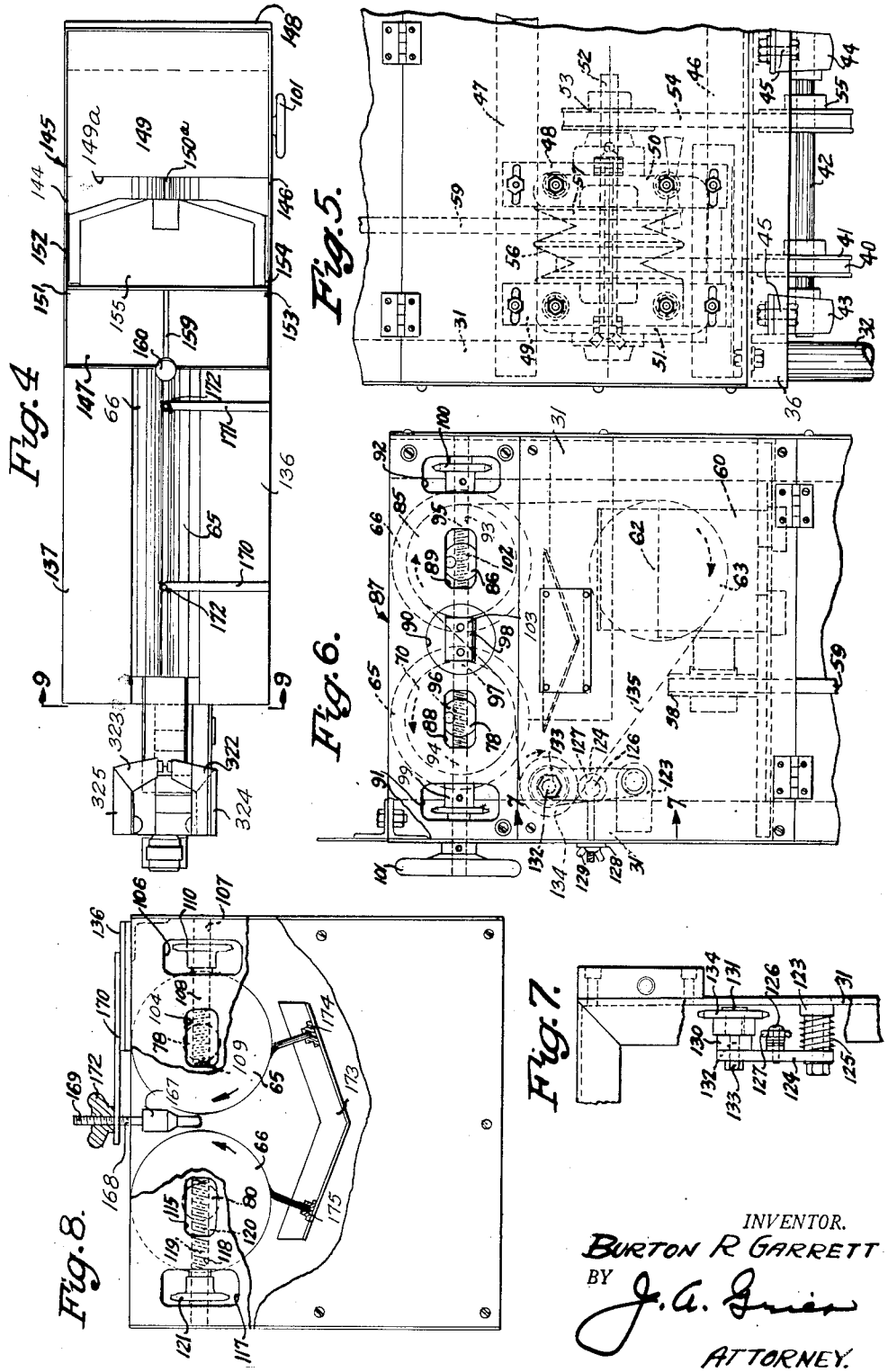

Sept. 18, 1956  B. R. GARRETT  2,763,108
COUNTING AND PACKAGING MACHINES
Filed April 9, 1952  7 Sheets-Sheet 4
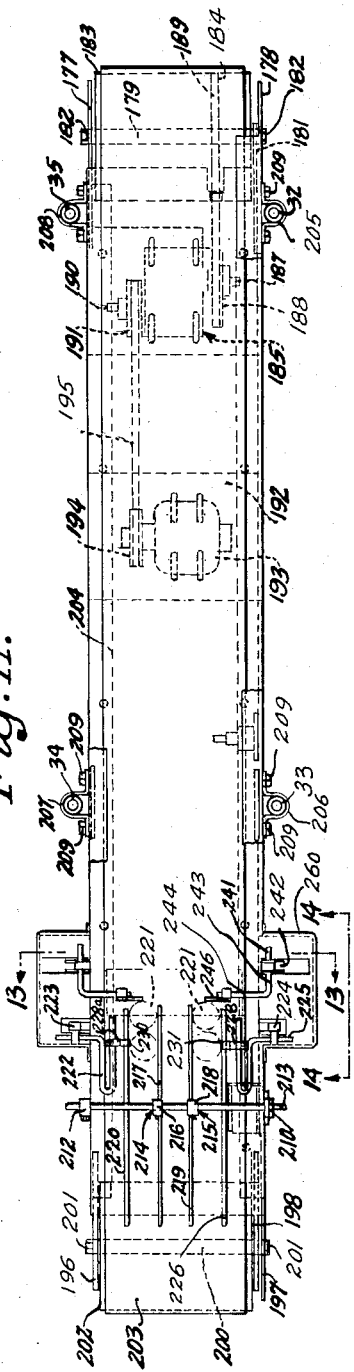
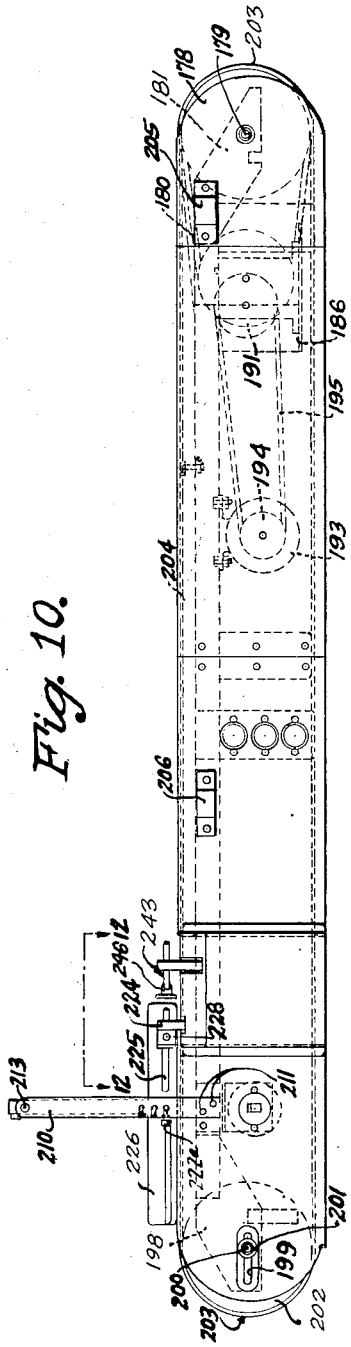
INVENTOR.
BURTON R. GARRETT
BY
ATTORNEY.

Sept. 18, 1956     B. R. GARRETT     2,763,108
COUNTING AND PACKAGING MACHINES
Filed April 9, 1952     7 Sheets-Sheet 5
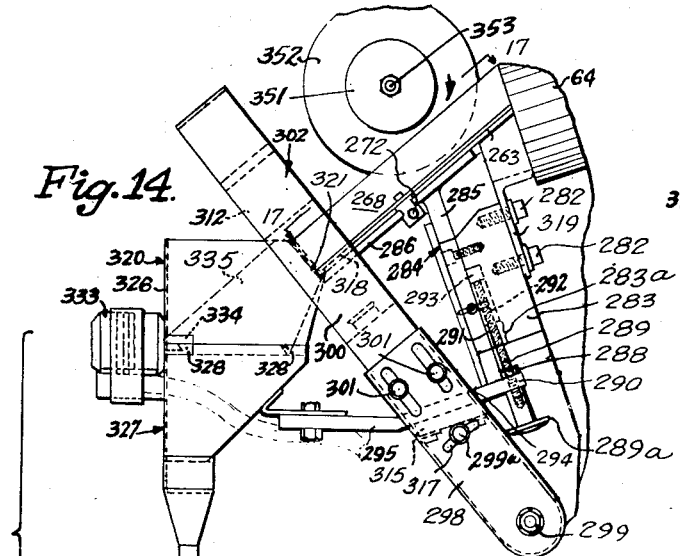
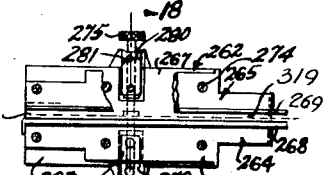
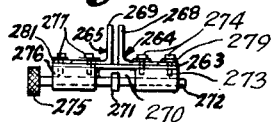
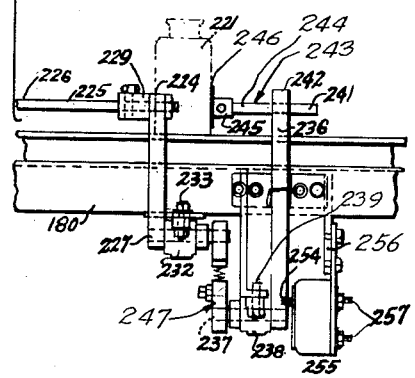
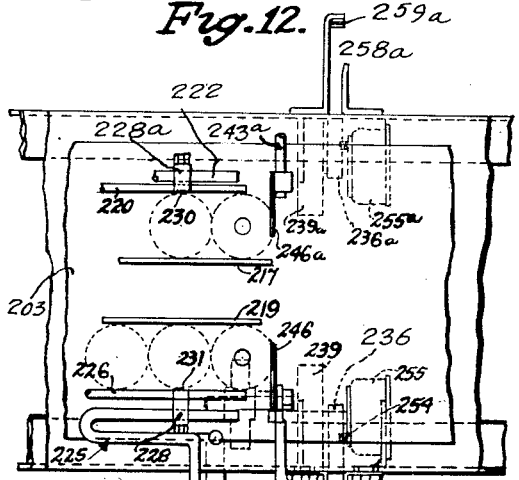
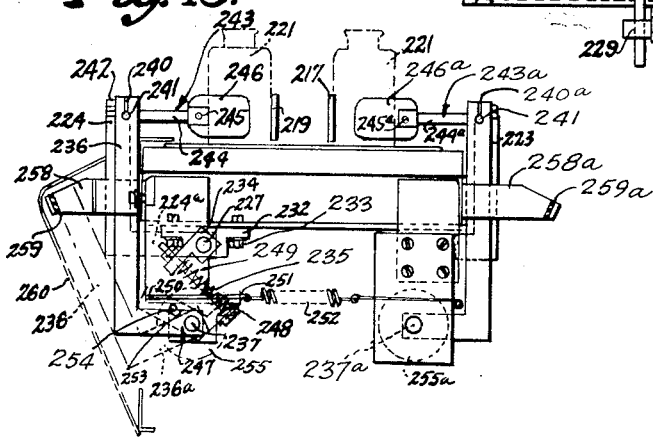
INVENTOR.
BURTON R. GARRETT.
BY J. A. Grier
ATTORNEY.

Sept. 18, 1956             B. R. GARRETT             2,763,108
COUNTING AND PACKAGING MACHINES
Filed April 9, 1952             7 Sheets-Sheet 6
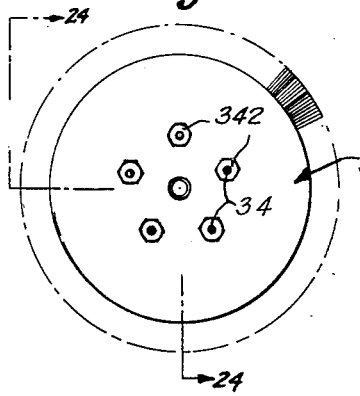
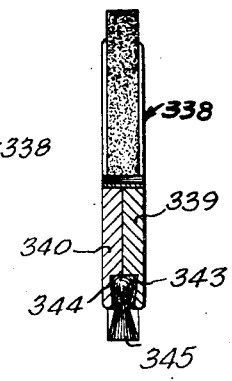
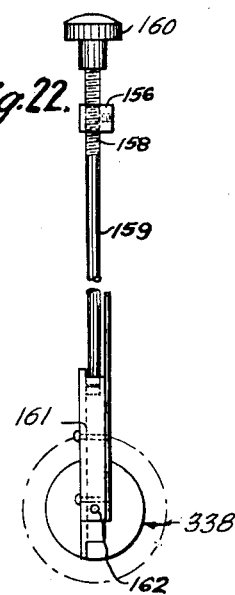
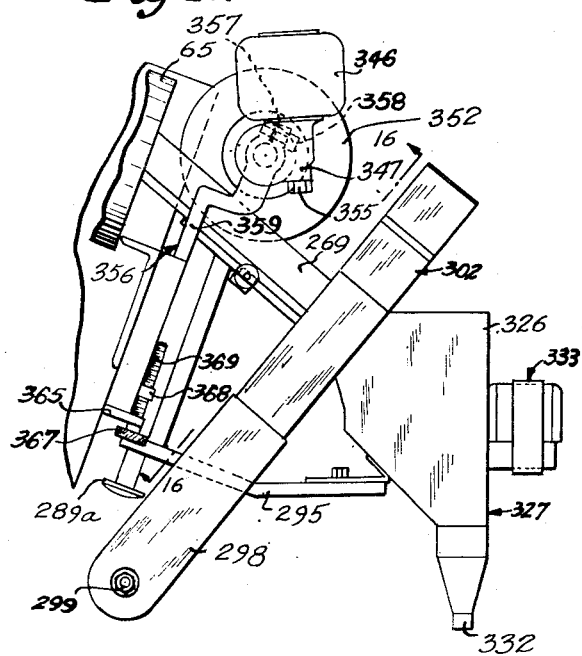
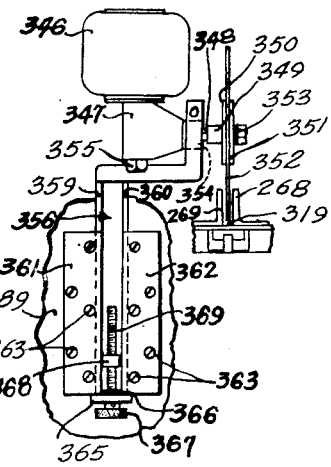
INVENTOR.
BURTON R. GARRETT
BY
ATTORNEY.

Sept. 18, 1956  B. R. GARRETT  2,763,108
COUNTING AND PACKAGING MACHINES
Filed April 9, 1952  7 Sheets-Sheet 7

INVENTOR.
BURTON R. GARRETT
BY
*J. A. Grier*
ATTORNEY.

United States Patent Office 2,763,108
Patented Sept. 18, 1956

2,763,108

COUNTING AND PACKAGING MACHINES

Burton R. Garrett, Bayside, N. Y.

Application April 9, 1952, Serial No. 281,350

20 Claims. (Cl. 53—59)

This invention relates to improvements in counting machines and has for an object the provision of a counting machine for accurately counting articles at a very high rate of speed.

This invention is a continuation in part of my earlier application Serial Number 51,559, filed September 28, 1948, for Sorting Machine; now Patent No. 2,661,090, dated December 1, 1953.

In both the sorting machine, and the counting machine, I employ a pair of inclined rotors having their outer surfaces ground. However, instead of adjusting the rotors to change the angular relation to the axes of the rotors as disclosed in said earlier application, I have provided means, according to the present invention, for keeping the rotors, and consequently their axes substantially parallel to one another.

The hopper for containing the articles and for delivering the articles to the rotors are similar in both the sorting machine and in the counting machine; however the counting machine employs special means for handling the articles, especially where they are of a fragile or of a frangible nature.

One object of the present invention is the provision, in a counting machine, of means operable from a single position for moving both ends of said rotors toward or away from one another, and maintaining them substantially parallel the while.

Another object of the invention is the provision, in a counting machine, of means for keeping the surfaces of the rotors clean at all times, and removable means to catch and retain material removed from the surfaces of said rotors.

A further object of the invention is the provision, in a counting machine, of a path for the articles, said path having transparent or translucent boundaries, and photo-electric means having a beam impinging thereon via at least one of said boundaries to be interrupted by each article traversing said path, and counting means controlled by said photo-electric means.

Yet another object of the invention is the provision of shutter means at the terminus of said path, said shutter means having two extreme positions and movable from one to the other under control of said counting means.

A further object of the invention is the provision, in a counting machine, of a pair of funnel-like passages, one of which receives the articles when the shutter means is in one position and the other of which receives the articles when the shutter means is in its other position.

Another object of the invention is the provision, in a counting machine, of conveyor means for moving pairs of containers for the counted articles, each pair of said containers being side by side and positioned below the funnel-like passages, and electrically controlled means for advancing said pairs after each pair has individually received the required number of articles.

Other objects and advantages of the invention will be apparent to those skilled in the art upon a study of this specification and the accompanying drawings.

Referring to the drawings:

Figure 1 is a side elevation of my improved counting machine, with the conveyor omitted, the position of the upper surface of the conveyor being shown in dot-dash lines;

Figure 2 is an end elevation of the machine shown in Figure 1;

Figure 3 is a plan view, partly in section, of my improved rotors, the supporting frame thereof, the rotor drive, and the means for spacing the rotors relative to each other;

Figure 4 is a top view of the machine of Figure 1;

Figure 5 is an elevation of the transmission taken along the line 5—5 of Figure 1;

Figure 6 is an elevation of the speed reducer and of the rotor drive, taken along the line 6—6 of Figure 1;

Figure 7 is a fragmentary view of the drive chain tightener taken along the line 7—7 of Figure 1;

Figure 8 is an end elevation, broken away to show the brushes for keeping the rotors clean, and the pan to catch the dust and other residue;

Figure 9 is a fragmentary end view showing the sprocket, chain arrangement at the lower ends of the rotors for moving the latter relative to each other;

Figure 10 is a side elevation of the conveyor;

Figure 11 is a plan view of the conveyor;

Figure 12 is a plan view of the conveyor-container feed controls as seen along the line 12—12 of Figure 10;

Figure 13 is a fragmentary sectional elevation as seen along the line 13—13 of Figure 11;

Figure 14 is an elevational view of the feed controls as seen along the line 14—14 of Figure 11, and showing the relation thereto of the photo-electric counting means and the associated mechanism;

Figure 15 is an elevation of the counting means as seen from the opposite side of the upper portion of Figure 14;

Figure 16 is an elevational view of the article accelerator shown in Figures 14 and 15;

Figure 17 is a plan view taken along the line 17—17 of Figure 14;

Figure 18 is a sectional elevation taken along the line 18—18 of Figure 17;

Figure 19 is a plan view of the photo-electric cell, exciting lamp unit of Figure 14;

Figure 20 is a side elevation of the unit shown in Figure 19;

Figure 21 is a view of one form of article control wheel;

Figure 22 is an elevational view of another form of control wheel and adjustable means supporting the same;

Figure 23 is a side elevation of the control wheel of Figure 22;

Figure 24 is a view taken along the line 24—24 of Figure 23;

Figure 27 is an end elevational view showing the portions of the bottles which receive the articles.

Figure 25:
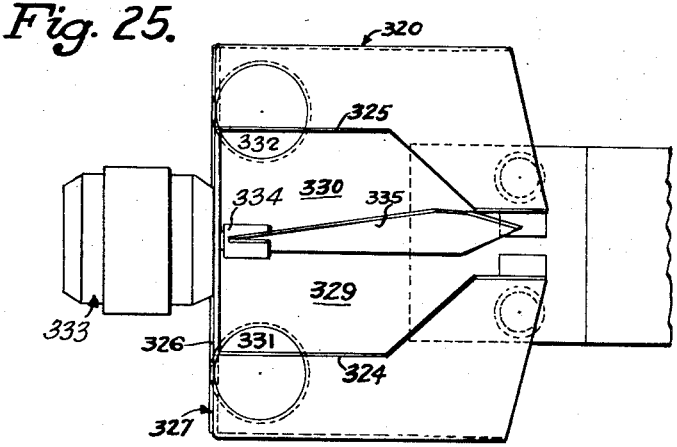
Figure 25 is an elevation taken along the line 25—25 of Figure 1.

Referring first to Figures 1, 2, and 4, the counter device includes a casing 30 which is mounted on an angle iron frame 31, and this frame is mounted on iron pipes 32, 33, 34 and 35, forming supporting feet for the device, and also for supporting conveyor means for the bottles or other containers into which the articles are counted.

These pipes are secured in any suitable manner in the four corners of a base angle iron frame 36 which is secured to and supports the angle iron frame 31.

A motor base 37 carried on the frame 36 has, adjustably mounted thereon, an electric motor 38 carrying a grooved pulley 39 which is connected via a V belt 40 to a grooved pulley 41.

Referring now to Figure 5 also, the pulley 41 is mounted on a shaft 42, which is journaled in bearings 43 and 44 secured on the frame member 36 by means of bolts 45. Secured in the frame member 31 are spaced cross-members 46 and 47, and adjustably carried thereon are vertical members 48 and 49, which support end plates 50 and 51. A shaft 52 journaled in said end plates carries a grooved pulley 53 which is connected to a similar grooved pulley 55, carried on the shaft 42, by means of a V belt 54.

The shaft 52 is counterbored, and carries in the counterbore, clutch elements which place the grooved pulleys 56 and 57, which are carried on the shaft 52 in driving relation. The pulley 57 is the driven one and it is connected to a grooved pulley 58 by means of a V belt 59, as seen in Figures 1 and 6.

The pulley 58 is mounted on the shaft 61 of a speed reducer 60. The speed reducer also carries a second shaft 62 which has keyed thereto a sprocket 63.

Referring now to Figures 1, 3 and 6, the device employs two inclined rotors 64 and 65. Since these rotors are identical, a detailed description of the rotor 64 is deemed sufficient. This rotor has a tubular body 66 with a tubular insert 67 secured in the right end thereof, which end is uppermost in the device. The tubular insert has a counterbore 68 formed therein to provide clearance and lightness. On the outer end of this insert 67 is formed an annular boss 69 which is stepped to provide a shoulder engaging a sprocket 70, which is secured on the boss 69 by means of screws 71. The boss 69 is also counterbored at 72 to accommodate a roller bearing 73, a retaining cup 74, and an oil retaining ring 75.

The inner race of the roller bearing abuts one end of a sleeve 76 which is secured on the fixed supporting shaft 78 by means of a taper pin 77.

The other end of the rotor sleeve carries an internal annulus 79 which is counterbored to form a shoulder which the flange on the cup member 80 abuts. A roller bearing 81 has its outer race abutting the flange on said cup, and its inner race abuts a ring or collar 82 which is secured on the shaft 78 by means of a taper pin 83. An oil retaining ring 84 contacts the roller bearing 81.

The other rotor 65 as stated above, is identical, however for reference to the sprocket thereon and to its fixed shaft, the sprocket is referred to as 85 and the fixed shaft as 86.

These shafts are referred to as "fixed" shafts, however it will be understood that in setting the device up, the fixed shafts may be moved toward and away from one another as will be hereinafter explained.

The cross-frame member 87 of the frame 31, has spaced elongated holes 88 and 89, best seen in Figure 6, which accommodate the upper ends of the shafts 78 and 86 respectively, the shafts having opposed flat surfaces formed thereon to slidably engage the surfaces of said holes. The cross-member 87 also has a central lateral hole 90, and two spaced elongated holes 91 and 92 formed therein. A longitudinal hole 93 is also formed therein passing through the holes 91, 88, 90, 89, and 92. Journaled in said longitudinal hole are aligned shafts 94 and 95.

The shaft 94 has a portion 96 which threadedly engages a threaded cross-hole formed near the upper end of the shaft 78, and has a portion 97 which is secured in a coupling 98, which is accessible via the hole 90. Secured on the shaft 94 within the hole 91 is a sprocket 99, and on the outer end of the shaft 94 is secured a hand wheel 101, by means of which the shafts 94 and 95 may be rotated. The shaft 95 has a threaded portion 102 which threadedly engages a threaded cross-hole formed near the upper end of the shaft 86, and has a portion 103 which is also secured in the coupling 98. The shaft 95 has keyed, or otherwise fixed thereon, a sprocket 100. The threaded portion 96 may be a right hand thread, and the threaded portion 102 may be a left hand thread, so that as the hand wheel 101 is turned in one direction, the shafts 78 and 86 are moved toward each other and are moved away from each other when the hand wheel 101 is turned in the opposite direction.

On the opposite end, Figure 9, the shaft 78 has similar flat surfaces formed thereon which slidably engage the horizontal edges of an elongated hole 104, formed in a cross-frame member 105 of the frame 31. Spaced apart from the hole 104 is a second elongated hole 106 having its longitudinal axis vertical, and extending through the frame member 90° with respect to and cutting the holes 104 and 106, is a bearing hole 107 in which a shaft 108 is journaled. The shaft 78 has a threaded cross-hole formed therein near the lower end, and this hole is engaged by a threaded portion 109 of the shaft 108. Secured on the shaft 108, within the hole 106, is a sprocket 110 which is connected to the sprocket 99 by means of a chain 111. The cross-frame member 105 is secured to the frame member 31 by means of screws 112 and it has a beveled clearance face 113 formed thereon.

The shaft 80 has opposed flat surfaces also formed on the lower end thereof, and this end extends into an elongated hole 115 formed in a second cross-member 114, which also has a beveled clearance face 116. The cross-members 105 and 114 are spaced apart from each other and they are in alignment. Spaced apart from the hole 115 is a second elongated hole 117 having its longitudinal axis vertical. A lateral bearing hole 118 extends through the cross-member 114 and cuts both the holes 115 and 117. A shaft 119 is journaled in the bearing hole 118 and has a threaded portion 120 which threadedly engages a threaded cross-hole near the lower end of the shaft 80.

A sprocket 121, positioned in the hole 117, is keyed on the shaft 119, and this sprocket is connected to the sprocket 100 by means of a chain 122. The threads 109 on the shaft 108 are of the same "hand" as the threads on the shaft 94. Of the opposite "hand" are the threads 120 on the shaft 119, which however are of the same "hand" as the threads on the shaft 95. Thus if the threads 109 and the threads on shaft 94 are right hand, the threads 120 and the threads on the shaft 95 are left hand, so that when the hand wheel is turned in one direction, the rotors move away from each other and yet remain parallel, and when the hand wheel is turned in the opposite direction, the rotors move toward each other and remain in parallelism.

Referring to Figures 6 and 7, the frame 31 carries a stepped boss 123 upon which a lever 124 is pivotally carried. A spring 125 surrounds the cylindrical part of the boss and urges the lever 124 counter-clockwise as viewed in Figure 6. A stud 126 is carried by the lever and embraced by an eye bolt 127 which extends through a hole in the frame 31 and is engaged by a washer 128 and a wing nut 129.

The lever 124 carries a boss 130, and a shouldered screw 131 has a sprocket 134 journaled thereon and the threaded shank portion 132 engages a threaded hole in the boss 130 and is secured therein by means of a nut 133.

A driving chain 135 spans the sprockets 63, 134, 70, and 85, and this chain engages the sprockets 70 and 85 in such manner that the rotors 65 and 66 rotate in opposite directions (as indicated by arrows in Figure 6) and the peripheral movement of the adjacent surfaces thereof is upwardly. The driving chain 135 may be tightened or loosened by means of the wing nut 129.

The casing 30 includes a top plate 136, spanning a portion of the rotor 65, Figures 1, 4, and 9, and a second top plate 137, spanning a portion of the rotor 66.

The shaft 78 has an oil passage 138 extending into it from one end thereof, and a cross-hole 139 therein communicates with this passage and the interior of the cup-like member 74, and an oil fitting 140 is carried in the outer end of the passage 138. This shaft also has a like oil passage 141 extending into it from the opposite end and communicating with a cross-hole 142 communicates with interior of the cup-like member 80, and an oil fitting 143 is carried in the outer end of the oil passage 141. The shaft 86 carries identical oiling arrangements.

Spanning the upper end of the casing 30 (the right end as viewed in Figure 1) is a hopper, generally designated by the numeral 145. This hopper has side walls 144 and 146, a front end wall 147, and a rear end wall 148. The hopper also has an inclined bottom wall 149 which joins a depending wall section 150.

Within the hopper 145 and spaced apart from the end wall 148 thereof are opposed angle members 151 and 152 arranged in one set on the interior of the wall 144, and like members 153 and 154 arranged in a set on the interior of the wall 146. Slidably mounted in the hopper 145 with one edge between the angle members 151 and 152 and with the opposite edge between the angle members 153 and 154, is a partition member 155, which may be slid to a plurality of heights in said hopper.

The hopper has a portion between the end 149a of the wall 149 in contact with the wall portion 150, thereby leaving an opening 150a therein communicating with the upper ends of the rotors 65 and 66.

The front end wall 147 of the hopper, Figures 1, 4 and 22, has a boss 156 secured thereto adjacent to the upper end thereof by means of a thumb screw 157. The boss 156 has a threaded hole therein parallel to the wall 147 which is threadedly engaged by the threaded portion 158 of a rod 159. A knurled knob 160 is keyed to the upper end of this rod, and the lower end is swiveled in a slidable frame 161 which is slidably mounted on the inner surface of the wall 166 so that the axis of the rod 159 is centralized above the space between the rotors 65 and 66. The notched mounts 164 and 165, Figure 21 are secured on the plate 166 in overlapping relation with the frame 161 and constitute the slideable mount. The lower portion of the frame 161 is bifurcated, and a shaft 162 is journaled in aligned holes therein and carries a gate wheel 163 which extends through a slot 163a in the end wall 147 of the hopper and consequently is partly within and partly outside the hopper and which extends downwardly to a point adjacent to the two rotors 64 and 65. By means of the knob 160, the relation between the wheel and the rotors may be varied, and the gate wheel 163 may be removed from the shaft 162 and replaced by other gate wheels as desired.

For driving the gate wheel 163 in a counter-clockwise direction (as viewed in Figure 1) rollers 303 and 304 are provided. The roller 303 contacts the rotor 64 and one face of the wheel 163, while the roller 304 contacts the rotor 65 and the opposite face of said wheel.

A support 305 carries a stud on which the roller 304 is journaled, and this support is slidably mounted on the wall 147 on an axis 45° with respect to one face of the wheel 163 and is urged into frictional contact with the rotor 65 and the wheel 163 by means of a spring 306 bearing against a bracket 307 carried on the outer face of the end wall 147.

A similar support 308 carries a stud upon which the roller 303 is journaled, and this support is slidably carried on the wall 147 on an axis 45° with respect to the opposite face of the wheel 163 and is urged into frictional contact with the rotor 64 and the wheel 163 by means of a spring 309 bearing against a bracket 310 carried on the outer face of the end wall 147.

Due to the fact that the rotors 65 and 66 rotate in opposite directions and with the adjacent surfaces moving upwardly, the pieces or articles being fed onto the rotors from the hopper 145 passing down the inclined surfaces of the rotors are engaged by the gate wheel 163 and consequently any tendency of the articles to jam inside the hopper, especially where the articles leave the hopper, is broken up, and the quantity of articles to flow out on the hopper rotors is controlled. The object is to have the articles fed out of the hopper as close together as possible. It will be understood that the smaller the articles to be counted are, the closer the bottom edge of the slidable partition member 155 is adjusted or positioned with respect to the bottom of the hopper.

A longitudinal bar 167 is provided with upwardly extending studs 168 having their upper ends 169 threaded. Secured on the plate 136 are spaced bracket members 170 and 171. These brackets have clearance holes therethrough to accommodate the studs 169 and when the studs are positioned in these clearance holes, they are engaged by wing nuts such as the wing nut 172. By means of the wing nuts the height of the bar may be adjusted relative to and within the space between the rotors 65 and 66.

Positioned beneath the rotors 65 and 66, Figure 8, is a V-shaped trough 173 carrying longitudinal brushes 174 and 175 which bear respectively against the under surface of the rotors 65 and 66 so that the trough may catch falling particles such as dust or filings, shavings, or parts which crumble off of pills, tablets or the like, and the brushes function to keep the surfaces of the rotors 65 and 66 clean.

Conveyor

A conveyor for bottles, boxes, cartons, and other receptacles is positioned below the mechanism described above and is secured onto the legs 32, 33, 34 and 35 of the machine with the upper surface of the conveyor substantially level with the line 176 shown on Figures 1 and 2.

Referring to Figures 10 and 11, the conveyor includes a frame having plates 177 and a plate 178 spaced apart therefrom, said plates having aligned holes therein through which a shaft 179 extends. The plates 177 and 178 are secured to an upper frame portion 180 and a plate 181 shaped somewhat like a parallelogram. The shaft 179 is secured in said plates by means of nuts 182 and journaled on the shaft 179 is a drum-like member 183 which has an annular groove 184 formed therein. A speed reducer 185 is mounted on a cross-support 186 within said conveyor and it has a shaft extension 187 which carries a grooved pulley 188 which is spanned by a belt 189 which also engages the groove 184 and consequently the drum-like member 183 is thereby rotated as the pulley 188 rotates.

The speed reducer 185 also has a shaft extension 190 which carries a grooved pulley 191. Spaced apart from the grooved pulley 191 and secured to a cross-plate 192 is an electric motor 193 which carries a grooved pulley 194 and is spanned by a belt 195 which also spans the grooved pulley 191, and consequently when the motor 193 is operated, the speed reducer 185 is in turn operated and the drum-like member 183 is driven by the belt 189 which spans the grooved pulley 188.

On the opposite end of the conveyor are plate members 196 and 197 and a reinforcing plate 198 which is somewhat in the form of a parallelogram, having aligned slots or elongated holes 199 formed therein and conjointly supporting a shaft 200. The shaft has tapped ends carrying cap screws 201, and journaled on the shaft 200 is a drum-like member 202. An endless belt 203 spans the drum-like members 183 and 202 so that when the drum-like member 183 is driven by the motor 193, the drum-like member 202 is rotated in unison therewith and the belt 203 moves along the upper surface 204 of the conveyor and thereby moves bottles or containers toward the end carrying the drum-like member 183. The conveyor belt 203 may be tightened by loosening the nuts 201 and moving the shaft 200 in the aligned slots 199. The conveyor is secured on the legs 32 to 35 inclusive by means of clamps 205, 206, 207 and 208 which are secured to the frame by means of cap screws 209.

Secured on the frame structure by means of screws 211 is an upright 210. In alignment therewith on the opposite side of the conveyor is a second upright 212. These uprights have aligned holes therethrough and positioned in these aligned holes is a shaft 213. Depending from the shaft 213 in spaced relation are spacer elements 214 and 215. The element 214 has a downwardly extending web 216, and a horizontal portion 217 which extends substantially parallel to the upper surface of the conveyor belt 203. The element 215 has a corresponding downwardly extending portion 218 and a corresponding horizontal portion 219. Spaced apart from the element 214 is a "T" shaped rod 220 which extends horizontally and which with the horizontal portion 217 forms a channel through which bottles or containers 221 may pass. The element 220 is supported in one of the several holes in the upright 212 in accordance with the heights of the containers used, and is fixed therein by a set screw 222a (Fig. 27). The bracket 222 is carried on a pivoted L-shaped lever 223, the upper end of which is shown in Figure 11 and a portion of which is shown in Figure 13, and adjustably supported thereon is a block 228a which has a clearance slot therethrough for the rod 220, and which carries friction pads 230. An identical L-shaped lever 224, Figures 10 to 14, supports a similar bracket 225 which adjustably carries a block 228 having a slot therein clearing a guide element 226, and carries friction pads 231. The element 226 is identical with the element 220 and is supported in one of several holes in upright 210 and secured by a screw 226a. Element 226 forms with element 219, a passage for containers 221.

Referring to the same figures mentioned above and particularly to Figures 13 and 14, the L-shaped lever 224 has its short leg 224a pivotally mounted on a shaft 227 which is journaled in a bearing member 232 secured to the conveyor frame 180 by means of bolts 233. Secured on the opposite end of the shaft 227 is an arm 234 which has a hole therethrough to accommodate a bolt 235 which will presently be described.

A second L-shaped lever member 236 has its short leg 236a secured on a shaft 237 which is journaled in a bearing 238. The bearing 238 is secured to a bracket 239 which is in turn secured to the frame 180. The lever 236 has a hole formed in the upper end thereof and a slot 240 communicates with said hole. Mounted in the hole is a leg 241 of an L-shaped shaft 243 which is adjustably secured therein by means of a locking screw 242. The other leg 244 of the L-shaped shaft 243 has secured thereto a boss 245 which carries a flat plate 246. The plate 246 forms a stop against which the bottles 221 in the row defined between 219 and 226 are arrested.

The shaft 237 has secured on the left end thereof, as seen in Figure 14, an L-shaped member 247, the short leg 248 of which has a hole therethrough to accommodate the head of the bolt 235 previously described. A spring 249 is positioned on the shank of the bolt 235 between the portion 248 and the arm 234. The L-shaped member 247 carries a pin 250 to which a rod 251 forming an extension of the spring 252 is secured.

The L-shaped lever 236 has a notch 253 formed therein and this notch is engaged by a stud 254 which projects from a rotary solenoid 255. This solenoid, as can best be seen in Figure 14, is mounted on a bracket 256 which in turn secured on the frame 180. The solenoid 255 is provided with terminals 257 which are connected to suitable controls as will hereinafter be described in connection with the circuit diagram of the machine. A bracket 258 is secured to the side of the machine and carries a pad 259 which arrests the L-shaped lever 236 when the latter is deflected. A bulged casing 260 is provided to house the L-shaped levers 224 and 236. When the solenoid 255 is energized, it rotates in a counter-clockwise direction, as seen in Figure 13, and through the medium of the pin 254 engaging the notch 253, causes the lever 236 to assume the position shown in dotted lines in Figure 13. As the lever 236 moves to this position, the L-shaped member 247 is also moved in a counter-clockwise direction and consequently the portion 248 moves in a direction to compress the spring 249 a predetermined amount, and this pressure is imparted to the arm 234 and thence via the shaft 227 to the L-shaped lever 224, thereby causing the bracket 225 and the block 228 thereon to move inwardly and cause the frictional element 231 to engage the bottle or container in the row between the guides 226 and 219. Now as the lever 236 moves down, it swings the plate 246 from in front of the end bottle in the row and allows it to move under the urge of the conveyor. The counting mechanism and the controls for setting off the operation just described after the required quantity of articles has been counted and delivered into the container will be presently described.

Since the frictional element 231 engages the second (next to the end) bottle or container, and since the plate 246 is swung from engagement with the end bottle in the row, the end bottle travels with the conveyor and moves out of the way.

As the elements just described are reset by the return of the plate 246 to its normal position, and by the retraction of the frictional element 231, the bottle or container held motionless by the latter moves forward under the urge of the belt 203 and is arrested in an article receiving position by the plate 246. The resetting of the elements is effected under the urge of the spring 252 when the solenoid 255 is deenergized.

The solenoid and corresponding elements associated with the guides 217 and 220 are substantially identical with those just described. Consequently a description of these elements would be repetitious, so instead these elements are given the same numeral as the corresponding ones described, followed by the letter *a*.

*Photoelectric counting system*

Referring now to Figs. 1, 4, 14, 15, 17 and 18, the rotors 64 and 65 deliver the articles into a guideway generally designated by the numeral 262. This guideway includes a support plate 263. Adjustably carried on this plate are L-shaped guide members 264 and 265 which have metallic horizontal legs 266 and 267, respectively, and transparent vertical legs 268 and 269, respectively. Centrally disposed beneath the support plate is a bar 270 which has a slot therein which is engaged by a collar 271 which, in turn, is carried on a shaft 272. A block member 273 has a threaded hole extending therethrough which is engaged by corresponding threads on the shaft 272. The block member 273 is notched to slide in a rectangular slot 278 in the support plate and it carries a top plate 279 secured thereto by means of screws 274 so that when the knob 275 is turned, the shaft 272 rotates and the guide member 264 is moved laterally.

A second block member 276 has a threaded hole extending therethrough which is engaged by corresponding threads on the shaft 272, and this block member is notched so as to be slidably carried in a slot 280 in the support plate and it carries a cover plate 281 which is secured thereto by means of screws 277. One of the threaded screws on the shaft 272 engaging one of the block members is right handed and the other is left handed, so that when the knurled knob 275 is rotated in one direction the guide members 264, 265 move toward each other and when the knob is turned in the opposite direction they move away from each other in order to accommodate larger or smaller articles.

A frame member 31a has secured thereto by means of cap screws 282 a metallic block 283, and secured to this block is a bracket member 284 which has an upright portion 285 and an inclined portion 286, upon which the support plate 263 is mounted. The bracket member 284 is slidably carried on the block 283 and is provided with suitable ways (not shown) along which it may be slid and a shaft 289 is journalled in a hole formed in an extension 290 of the bracket 284. This shaft is provided with threads 291 which engage a corresponding threaded hole formed in a portion of the block 283a which is secured to the bracket member 284. A collar 288 is secured on shaft 289 to eliminate end play thereof. A clearance slot 293 is formed in the block 283 to allow the bracket member 285 to be adjusted upwardly or downwardly by rotating knob 289a.

The lower end of the bracket member 284 has an extension 294 which extends substantially 90° with respect to the axis of the portion 285 and this extension carries a second portion 295 which extends substantially horizontally. Secured to the portion 294 is an angular bracket having legs 296 and 297. Secured to leg 297 Figure 20 by means of bolts 299 is a plate member 298 which has a portion extending beyond the leg 296 to which is secured a base member 300 by means of cap screws 301. Mounted on the base 300 is a photoelectric unit generally designated by the numeral 302.

The photoelectric unit 302 is comprised of a casing 311 which contains an exciting lamp, the light from which impinges upon a photoelectric cell mounted in a casing 312 via a lens 313. Adjacent to the casing 312 is a casing 314 which contains an amplifying tube for amplifying any impulse instituted by the change of light falling upon the photoelectric cell. The base member 300 has an extension 315 the axis of which is 90° with respect to the axis of the main base 300. This extension is provided with screw holes 316 to enable the photoelectric unit to be mounted in a different position in connection with some types of counting. The plate 298 above described is pivotally mounted on the bolt 299 and the screw 299a extends through an arcuate slot 317 (Fig. 14) so that the unit 302 may be adjusted relative to the space between the guideways 264 and 265, and thereby the light beam is adjusted relative to the edge of the vane 335. Screws 301 extend through elongated slots parallel to the axis of the plate 298 so that the photoelectric cell unit assembly 302 may be adjusted on the plate 298. The support plate 263 above described is preferably made of metal and it has a cut-out portion into which is set transparent panel 318. This panel may be formed of an acrylic, of glass or of any other suitable material. With the photocell unit 302 mounted in the position shown in Figure 14, the exciting lamp emits a beam which passes through the transparent panel 318 and impinges upon the photoelectric cell in the casing 312, and this beam is either partially or completely interrupted by an article passing down the passage 319 between the legs 268, 269.

Now if it is desired to count certain articles by having the beam project through the legs 268, 269, to be intercepted by the articles to be counted, the extension 315 is employed.

*Electronic controlled shutter*

The articles to be counted pass down the passage 319 between the vertical legs 268 and 269, as above described, and change the quantity of light impinging upon the photoelectric cell as they pass over the transparent insert 318 for example. From there they fall into a housing 320 which has a funnel-shaped entrance 321 defined between walls 322 and 323. These walls respectively join depending walls 324 and 325 which, in turn, join a front wall 326. Detachably secured to the bottom of the housing 320 is a bifurcated funnel housing 327 which is secured to the housing 320 by means of wing nuts 328. The funnel housing has inverted frusto-conical portions 329 and 330 which terminate in tubular extensions 331 and 332, respectively.

A rotary solenoid 333 has a shaft 334 which has a cross-slot therethrough and mounted in this cross-slot is a shutter 335 which is so-shaped that when it is in one normal position the frusto-conical portion 329 is isolated from communication with the housing 320 and when it is in its other normal position the frusto-conical portion 330 is isolated from communication with the housing 320. This means that when the shutter is in the first mentioned position articles counted pass from the housing 320 and via the tubular extension 332 and on into the container on the conveyor. By the same token, when the shutter is in the second mentioned normal position, articles counted pass from the housing 320 and via the extension 331 into a container on the conveyor. The solenoid 333 is provided with an armature (not shown) which is connected to the shaft 334 and which rotates through a predetermined arc when a winding 336 thereof is energized. Another winding 337 thereon, when energized, causes the shaft to rotate through an arc in the opposite direction and these partial rotations of the shaft control the movement of the shutter 335. The shutter as shown in Figure 25 is displaced from its normal position so that the arrangement of the housing, the compartments and the tubular extensions can be more clearly visualized.

Referring to Figures 22, 23, and 24, a form of article control 338 is shown, and this article control is particularly suitable for controlling the delivery of frangible articles from the hopper 145 of Figures 1 and 2, onto the rotors 65 and 66.

The article control 338 is comprised of disc-like members 339 and 340 which are substantially identical and which are secured together in face to face relation by means of screws 341 and nuts 342 which are set into the outer surfaces thereof. Each of the members 339 and 340 has an annular groove formed therein and these grooves coincide when the members are secured together to form an annulus 343. Mounted in the annulus 343 is an annular brush 345 having the apexes 344 of the bristles positioned in and clamped in the annulus 343. This brush assembly is mounted on the shaft 162 and is driven by the rollers 303 and 304, contacting the rotors 64 and 65 respectively and the outer faces of the disc-like members 339 and 340. The brush rotates in a direction counter to the movement of the articles passing out of the hopper and onto the rotors, thereby controlling the delivery of such articles to the rotors. By making the article control in the form of a brush I minimize crumbling or other damage to certain types of pills which by any form of control would be damaged to a point where they would be unsalable.

Referring now to Figures 14 to 18 inclusive a special feed control is comprised of an electric motor 346 which has a gear reduction 347 which has a take-off shaft 348. This shaft carries a shouldered boss 349 having a flange 350, against which a feed control wheel 352 is clamped by means of a second flange 351 and a screw 353 which engages a threaded hole in the boss 349. The control wheel 352 is preferably formed of gum rubber, because of its elasticity, and because it is impervious to all kinds of articles counted by my machine.

The housing for the gear reduction 347 has a mounting boss 354 thereon which fits a corresponding hole in an offset supporting bracket 356. The bracket has a slot 357 formed therein in communication with said hole, and a cap screw 358 is provided for clamping the boss 354 in said hole and thereby supporting the motor and feed control wheel on said bracket.

The bracket has V edges 359 and 360 which cooperate with corresponding V edges formed on guide blocks 361 and 362, and these guide blocks are secured to the end wall 364 by means of screws 363. Secured on the guide blocks is a bracket 365 with a hole therethrough to accommodate a shaft 369, a collar 366 being secured to the shaft on one side of the bracket 365, and a knob 367 is secured to the shaft on the other side of the bracket in such manner that the knob may be freely turned in either direction with substantially no lost motion. A boss 368 on the bracket 356 has a threaded hole therethrough which is engaged by threads formed on the shaft 369, so that by means of the knob 367 the height of the wheel 352 in the passage 319 may be adjusted in accordance with the physical sizes of the articles to be counted. A screw 355 is provided for regulating the relation between the elements of the gear reduction.

My special feed control functions as follows:

Articles to be counted are fed from the hopper 145 on to the rotors 64 and 65 and they pass down the rotors because the later are inclined. The wheel 163 or any other suitable retardant, for example, a brush wheel such as the wheel 338 is rotating counter to the movement of the articles to be counted and consequently such wheels function to break up any tendency of the articles to jam just prior to and as they are leaving the hopper and to control the quantity of articles that flow from the hopper rotors. Spacing between the articles as they pass from the lower ends of the rotors into the passage 319. Each article varies or interrupts the light passing from the exciting lamp 311 to the photoelectric cell 312.

As the articles leave the rotors 64 and 65 and pass into the passage 319, between the legs 268 and 269, they encounter the control wheel 352 and are propelled forward (in the direction in which they are normally moving) at an accelerated rate of speed, with the result that each article, due to the acceleration, interrupts or varies the light at exactly the same speed regardless of the speed of the rotors. This insures correct timing between the speed of the article past the light beam and the action of the vane 335 in separating the articles. This also makes it unnecessary to adjust the position of the eye beam for different sizes of articles and different speeds of the rotors.

This means that each article is certain to be counted, and that it is passed into its intended container with greater dispatch.

Figure 26:
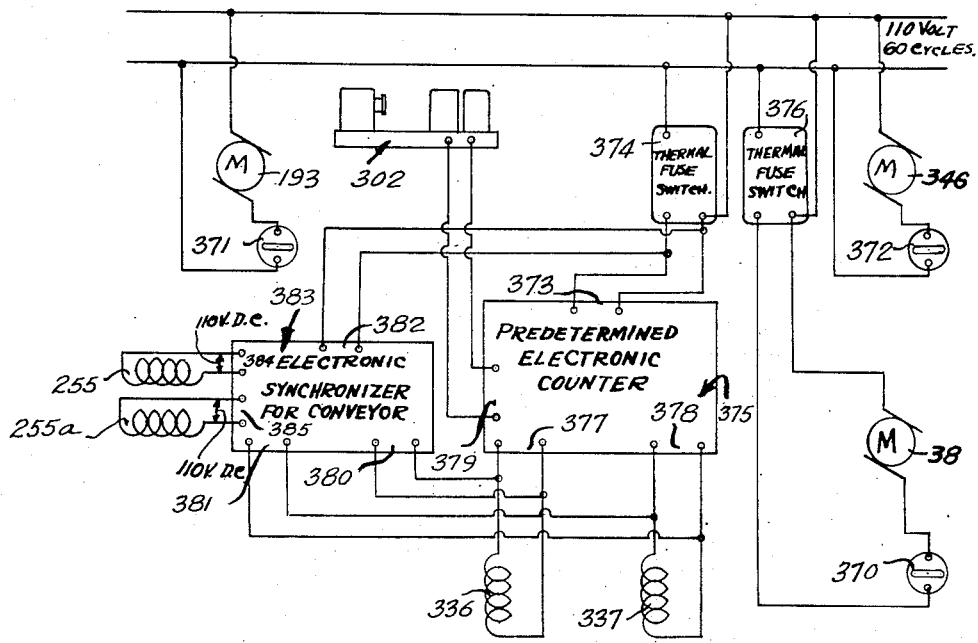
Figure 26 is a circuit diagram.

In Figure 26 I show the circuit diagram of the machine. The main drive motor 38, with a switch 370 in series therewith, is connected to the 110 volt 60 cycle source. The conveyor motor 193, with a switch 371 in series therewith, is connected to the 110 volt 60 cycle source also. Likewise the feed regulator motor is connected to said source, and is provided with a switch 372.

A predetermined electronic counter 375, which is a purchased article, has a pair of terminals 373 which is connected via a thermal fuse switch 374 to the 110 volt 60 cycle source. The counter also has pairs of terminals 377, 378, and 379. The terminals 379 are connected to the photoelectric cell assembly 302, and the terminals 377 and 378 are connected to the rotary solenoid windings 336 and 337 respectively. A second thermal fuse switch 376 is provided in the circuit of the motor 38.

An electronic synchronizer 383 for the conveyor has a pair of terminals 382 which are connected in parallel with the terminals 373 on the counter 375, and consequently are connected to the 110 volt 60 cycle source. The synchronizer has terminals 380 which are connected in parallel with the terminals 377 on the counter and consequently, in parallel with the winding 336. The terminals 381 are connected in multiple with terminals 378 and consequently with the winding 337.

The synchronizer 383 also has pairs of terminals 384 and 385 to which the conveyor solenoids 255 and 255a are connected, and it controls the arresting and the releasing of the containers on the conveyor.

The electronic counter 375 may be set for any given number of articles; it will energize one or the other solenoids 336 and 337 via the terminals 377 and 378, respectively, thereby causing the shutter 335 to swing to one or the other of its normal positions. At about the same time, a corresponding one of the solenoids 255 or 255a effects the release of a container from beneath the other extension with the desired number of articles in it, and the arrest of an empty container under said extension, ready to receive articles during the next succeeding counting cycle; the container which was arrested during the preceding cycle is the one which now receives the articles. With my machine running, the articles are delivered onto the rotors 64 and 65. As they reach the mouth of the hopper 145, they are regulated by a rotor 163 or brush 338 rotating counter to the movement of the articles. As the articles leave the rotors they encounter the regulator wheel 352 which causes them to move across the beam of the exciting lamp at predetermined rates of speed. The articles, after crossing the exciting light beam (in the area 318, Figures 14 and 17), pass into the housing 320, and out via 331 or 332, according to the position of the shutter 335, and into one or the other container on the conveyor.

The conveyor is moving slowly, and when the containers thereon are arrested, the slow movement of the conveyor exerts a constant urge on all of the containers, and whenever any container is released it moves forward instantly. The containers are placed on the conveyor in two rows, and the containers in these rows are alternately filled and released.

Although I have herein shown and described, by way of example, one embodiment of my automatic counting device, it will be understood that many changes may be made, in the arrangements shown and described, within the scope of the appended claims.

What is claimed is:

1. In a device for counting articles, a pair of inclined substantially parallel rotors, means to rotate said rotors in opposite directions so that adjacent surfaces thereof are moving upwardly, a hopper at and communicating with the upper ends of said rotors for delivering articles thereto, rotative means acting peripherally against said articles and counter to the direction of said articles as they are moving out of said hopper for spacing said articles, means to count said articles and to deliver them into individual containers in groups.

2. In a counting device, a pair of substantially parallel inclined rotors, means to rotate said rotors in opposite directions so that adjacent surfaces thereof are moving upwardly, a hopper at and communicating with the upper ends of said rotors for delivering articles thereto, rotary means acting peripherally against and counter to the direction of movement of said articles as they leave said hopper for spacing them along the trough-like space above and partially between the rotors, and means to count said articles.

3. In a counting device, a pair of substantially parallel inclined rotors, means to rotate said rotors in opposite directions so that adjacent surfaces thereof are moving upwardly, means connected to both ends of said rotors and operable from one position to adjust said rotors toward and away from each other while maintaining them in parallelism, said last means including screw means at each end of each rotor for moving said rotors, and driving means between said screw means, and means adjacent to one end of said rotors for operating all said screw means conjointly, an article hopper at and communicating with the upper ends of said rotors for delivering articles thereto, means to count said articles and to deliver them into individual containers in groups.

4. In a counting device, a pair of inclined rotors, means to rotate said rotors in opposite directions so that adjacent surfaces thereof are moving upwardly, mechanism interconnected with said rotors for adjusting the spacing of the latter and for moving them in unison and maintaining them in parallelism, said mechanism including screw means at each end of each rotor for moving said rotors, and means operatively connected to all said screw means for moving them conjointly, an article hopper at and communicating with the upper end of said rotors for delivering articles on to said rotors, a guideway for receiving articles from said rotors, at least a portion of said guideway being of light transmitting nature, means to receive articles from said guideway and to deliver them into a container, and an exciting lamp and light responsive means adjacent to said portion for counting said articles.

5. In a counting device, a pair of inclined rotors, means to rotate said rotors in opposite directions so that adjacent surfaces thereof are moving upwardly, mechanism interconnected with said rotors for adjusting the spacing of the latter and for maintaining them in parallelism, an article hopper at and communicating with the upper end of said rotors for delivering articles on to said rotors, a guideway for receiving articles from said rotors, at least a portion of said guideway being of light transmitting material, a housing for receiving articles from said guideway, said housing having shutter means therein and a plurality of exits each made accessible to the articles by the position of said shutter means, separate means to receive articles from said exits, and photo-electric means to count the articles and to position said shutter means.

6. In a counting device, a pair of inclined rotors, means to rotate said rotors in opposite directions so that adjacent surfaces thereof are moving upwardly, mechanism interconnected with said rotors for adjusting the spacing of the latter and for maintaining them in parallelism, an article hopper at and communicating with the upper end of said rotors for delivering articles on to said rotors, a guideway for receiving articles from said rotors, at least a portion of said guideway being of light transmitting material, a housing for receiving articles from said guideway, said housing having a shutter and a pair of exits, each alternately uncovered by said shutter and thereby made accessible to the articles, a support below said exits and means to position containers thereon, one beneath each exit, photo-electric controlled means to count a predetermined number of articles into each container and to shift the position of said shutter after each count.

7. In a counting machine, a pair of rotors having their axes on a common inclined plane, mechanism interconnected with both ends of said rotors for maintaining said rotors with their axes parallel at all times and including a single hand wheel for changing the space between the rotors at the will of an operator, means to rotate said rotors in opposite directions so that their adjacent surfaces are constantly moved upwardly, a hopper on said rotors adjacent to their upper ends, said hopper having a bottom opening communicating with said rotors, a rotating regulator on said hopper for controlling the flow of articles passing down said rotors, a guideway at the lower ends of said rotors positioned to receive articles therefrom, at least a portion of said guideway having light transmitting properties, photo-electric means cutting said portion, an electronic counting and control means controlled by said photo-electric means for counting and apportioning said articles.

8. In a counting machine, a pair of rotors having their axes on a common inclined plane, mechanism interconnected with said rotors for maintaining said rotors with their axes parallel at all times and for changing the space between the rotors at the will of an operator, means to rotate said rotors in opposite directions so that their adjacent surfaces are constantly moved upwardly, a hopper on said rotors adjacent to their upper ends, said hopper having a bottom opening communicating with said rotors, a rotating regulator on said hopper for controlling the flow of articles passing down said rotors, a guideway at the lower ends of said rotors positioned to receive articles therefrom, at least a portion of said guideway having light transmitting properties, means to receive articles from said guideway and to deliver them into a container, and an exciting lamp and light responsive means adjacent to said portion for counting said articles.

9. In a counting machine, a pair of inclined rotors having their axes on a common plane in spaced parallel relation, means to vary the spaced parallel relation of said axes, means to rotate said rotors in opposite directions so that their adjacent surfaces are constantly moved upwardly, an article hopper on and having a bottom opening communicating with the upper ends of said rotors, rotary means on said hopper moved by at least one of said rotors for delivering articles from the hopper to the rotors outside said hopper, a guideway at the lower ends of said rotors positioned to receive articles therefrom, at least a portion of said guideway having light transmitting properties, photo-electric means including an exciting lamp passing a beam of light through said portion and a light-sensitive cell to receive the beam, electronic means to receive impulses due to interruptions of the light beam by the articles, and means controlled by said last means for receiving articles as they are counted.

10. A counting machine according to claim 9, wherein the means controlled is a conveyor for containers to receive the articles counted, and in which a housing with two outlets receives the articles after they are counted, magnetically controlled shutter means in said housing to effect the delivery of articles via one or the other outlet, and means on said conveyor for arresting and releasing containers in accordance with the position of said shutter means.

11. In a counting machine wherein a series of articles is spacedly released from a group of articles, inclined rotor means including a pair of substantially parallel rotors to receive said series, means to drive said rotor means in opposite directions so that their adjacent peripheries are moving upwardly, and spacing and regulating means for said articles driven by said inclined means and comprised of a rotary brush having a peripheral portion thereof which engages said articles tending to move the articles in a direction opposite to their movement down said inclined means, and driving means frictionally driven by said rotors and operatively connected to said rotary brush.

12. In a counting machine wherein a series of articles passes from a hopper containing a supply of articles down an inclined guideway comprised of a pair of cylinders rotated so that adjacent surfaces thereof are moving upwardly and are counted by impulses instituted by the articles varying the amount of light delivered from an exciting lamp beam to a cooperative photo-electric cell, a regulating wheel at the upper end of said guideway and rotating in a direction to cause a portion of the periphery thereof to retard the movement of articles onto said guideway from said supply, and a second wheel member moving in the opposite direction and engaging said articles between the time they leave said regulating wheel and the time they cross the path of said light for accelerating the movement of said articles as they cross said path of light thereby effecting the cutting of said light at a rate at least approaching a uniform rate.

13. In a device of the character described, a pair of inclined rotors down which articles being handled are moved, a generally V-shaped trough beneath and coextensive with both said rotors, an elongated brush supported in said trough contacting one of said rotors longitudinally, a second elongated brush supported in said trough in spaced apart relation to said first brush and contacting the other rotor longitudinally, said brushes being adapted to clean said rotors as they rotate, and a discharge passage at the lower end of said trough through which material brushed from said rotors may pass.

14. In a device of the character described, a pair of rotors parallel to each other, each rotor being mounted on its own longitudinal shaft, lateral screw shafts at each end of and operatively connected to said first shafts, cooperative rotatable means carried on and extending between said lateral shafts for changing the spacing between said rotors and manual means for rotating at least one of said shafts in either direction.

15. In a device for counting articles, a conveyor for containers, two adjacent stations on said conveyor where the containers are arrested to be filled, electromagnetic means to arrest said conveyor and the containers thereon with at least one container in position to be filled, other electromagnetic actuated means for releasing a container at one of said stations, and other separate electromagnetic actuated means cooperating with said first electromagnetic means for causing the container at the other of said stations to receive articles.

16. In a device of the character described, a hopper, an inclined guideway to receive articles to be counted from a supply of articles in said hopper, said guideway including both lateral light transmitting areas and a light transmitting area in the base thereof, and photo-electric means carrying mountings adapted to be set in a first position for a light beam thereof to traverse said guideway laterally when certain types of articles are to be counted and set in a second position to deliver a light beam through said base when other types of articles are to be counted, and a regulating wheel at the upper end of said guideway, and means to rotate the same in a direction to cause the lower portion of its periphery to accelerate and regulate the passage of articles across the beam of light regardless of either position in which it is set.

17. In a combination with a counting machine of the character described, photoelectric means for counting articles handled by said machine, a conveyor movable on a path below said photoelectric means and having two adjacent stations where containers positioned thereon in two rows are arrested in positions to receive said articles, arresting means for said containers comprising an individual vane for each row normally arresting a leading container in its row at said station, individual electromagnetic means for each vane, and means controlled by the means for counting articles for actuating the electromagnetic means of and displacing the vane arresting the container receiving articles and allowing it to be advanced by the conveyor.

18. The invention according to claim 17 in which holding means on said conveyor engages the container following the one arrested by said vane and prevents it from moving forward when the last mentioned container is released by the electromagnetic displacing of said vane, and means to release said holding means when said vane returns from its displaced position to its arresting position.

19. A counting machine according to claim 12 wherein said second wheel member is adjustably mounted on said machine and may be set in accordance with the sizes of the articles to be counted.

20. In a counting machine wherein a series of articles is spacedly released from a group of articles, inclined rotor means including a pair of substantially parallel rotors to receive said series, means to drive said rotor means in opposite directions so that their adjacent peripheries are moving upwardly, and spacing and regulating means for said articles driven by said inclined means and comprised of a rotary brush having a peripheral portion thereof which engages said articles tending to move the articles in a direction opposite to their movement down said inclined means, said inclined means to receive said series being comprised of a pair of L-shaped channels and having screw means interconnected therewith for moving said channels, thereby varying the space between the upright legs thereof to accommodate different sized objects.

References Cited in the file of this patent

UNITED STATES PATENTS

| | | |
|---|---|---|
| 891,694 | Hill | June 23, 1908 |
| 1,604,133 | Rebechini | Oct. 26, 1926 |
| 1,663,987 | Jamieson | Mar. 27, 1928 |
| 1,672,462 | Mansell | June 5, 1928 |
| 1,803,993 | Brennan | May 5, 1931 |
| 1,883,369 | Hardman | Oct. 18, 1932 |
| 1,974,128 | Thompson | Sept. 18, 1934 |
| 2,059,398 | Roemer | Nov. 3, 1936 |
| 2,144,708 | Rau | Jan. 24, 1939 |
| 2,403,862 | Lakso | July 9, 1946 |
| 2,470,926 | Gieseke | May 24, 1949 |
| 2,493,464 | Nelson | Jan. 3, 1950 |
| 2,523,517 | Potter | Sept. 26, 1950 |
| 2,534,362 | Magnuson | Dec. 19, 1950 |
| 2,594,337 | Noe | Apr. 29, 1952 |